Nov. 20, 1934.  J. O'F. CLARK  1,981,541
PIN LOCK
Filed Dec. 15, 1933
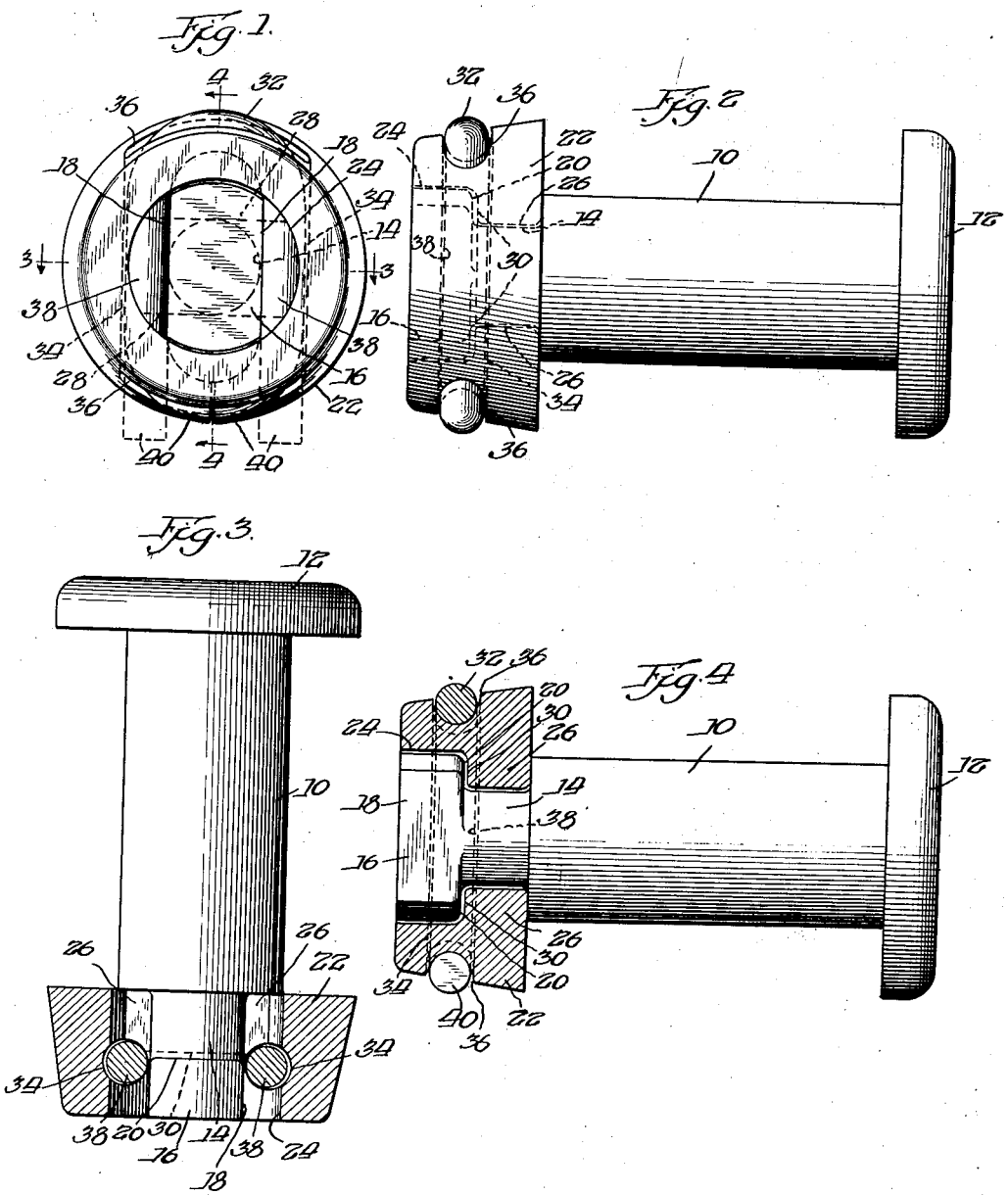
Witness:
R. B. Davison.
Inventor:
John O'Falon Clark
By Wilkinson Huxley Byron & Knight
Attys Patented Nov. 20, 1934

1,981,541

UNITED STATES PATENT OFFICE 1,981,541

PIN LOCK

John O'Fallon Clark, University City, Mo., assignor to American Manganese Steel Company, Chicago Heights, Ill., a corporation of Maine Application December 15, 1933, Serial No. 702,437

4 Claims. (Cl. 85—8)

This invention relates to improvements in pin locks which include a pin, a nut and a locking key for holding the nut in place upon the pin.

It is an object of the present invention to provide an improved design in which the nut is held against displacement axially with respect to the pin by cooperating lugs formed on the pin and on the nut, while the locking key merely holds the nut and pin against relative rotation and is not placed under any shearing strain.

It is further an object of my invention to provide a design in which the pin does not require any key holes that would tend to weaken the structure.

Further improvements reside in the improved design of the locking nut which is adapted to receive a U-shaped locking key, the ends of which may be bent after the key is in place into a substantially ring-shaped formation in which the U-shaped head of the pin and the ends of the pin are received in cut-out portions on the exterior of the nut in such manner that they will be protected against distortion.

It is further an object of my invention to provide a simple design in which the parts may be readily manufactured from manganese steel castings by the use of ordinary stationary grinders.

Further objects and advantages will be more readily apparent from the following description taken in connection with the attached drawing, in which—

Figure 1 is an end view of the assembled construction, the dotted lines showing the ends of the locking pin before being bent into place.

Figure 2 is a side elevation of the structure shown in Figure 1.

Figure 3 is a cross section on the plane indicated 3—3 in Figure 1, and

Figure 4 is a cross section on the plane indicated 4—4 in Figure 1.

The pin 10 formed of manganese steel has a head 12 at one end. At the other end the pin has a short cylindrical portion 14 of reduced diameter with respect to the body of the pin. The extreme end 16 of the pin conforms in one dimension to the diameter of the body of the pin but in the transverse dimension is equal to the diameter of the reduced portion 14, as shown clearly in Figure 2. Thus, the end 16 has flattened sides 18 and provides lateral shoulders 20, as indicated in Figure 4. The nut 22 is designed to fit over the end 16 of the pin and then be rotated through 90° to bring it to its locked position. Thus, the nut 22 has a circular opening 24, which is adapted to freely admit the end 16 of the pin and is further formed with lugs 26 extending across the opening 24 as in Figure 1. The dotted lines in this figure indicate the flat faces 28 of the lugs 26. Thus, the lugs 26 provide shoulder faces 30 which, when the nut is rotated to the position shown, engage the shoulders 20 of the pin to prevent axial displacement of the nut with respect to the pin.

In order to hold the nut and pin in the assembled position shown, a locking key 32 is provided which cooperates with the nut and the end 16 of the pin. The nut has a pair of spaced openings 34 extending transversely through the nut. These openings at their end portions communicate with arcuate cut-outs 36 formed in the opposite sides of the nut. The locking key is formed from a rod to a U-shape. As indicated in Figure 1, the key 32 may be fitted laterally into place in such manner that the side portions 38 of the key engage the flat sides 18 of the pin end 16 and prevent rotation of the nut relative to the pin. The free ends 40 of the locking key protrude beyond the nut, as indicated in dotted lines in Figure 1, and are bent towards each other, as shown in full lines in this figure and in such position are protected against distortion by being received in the cut-out portion 36 of the nut.

It will be readily apparent that the construction is simple in design, enabling the parts to be manufactured from manganese steel and the parts may be quickly and readily assembled when in use. In the assembled position the locking key is not subject to shear since the axial strain is borne between cooperating shoulders of the pin and nut.

I claim:

1. In combination, a pin, a nut adapted to fit on said pin in one position and to be partially rotated to its locked position, cooperating shoulders on said pin and nut adapted to be brought into engagement by the relative rotation between said pin and nut, said pin having flat faces formed thereon and a U-shaped key extending transversely through said nut into engagement with the flat faces of said pin to prevent relative rotation between said pin and nut, the free ends of said key being bent towards each other to prevent displacement of said key.

2. In combination, a pin, a nut adapted to fit on and adapted to be rotated relative to said pin, cooperating shoulders on said pin and nut adapted to be brought into engagement by the relative rotation between said pin and nut, said nut having a pair of openings extending transversely therethrough and a U-shaped locking key adapted to be inserted through said openings into engagement with said pin to hold said pin and nut against relative rotation, the free ends of said key beng bent towards each other to prevent displacement.

3. In combination, a pin, a nut adapted to fit on and adapted to be rotated relative to said pin, cooperating shoulders on said pin and nut adapted to be brought into engagement by the relative rotation between said pin and nut, said nut having a pair of openings extending therethrough and a U-shaped locking key adapted to be inserted through said openings into engagement with said pin to hold said pin and nut against relative rotation, the free ends of said key being bent towards each other to prevent displacement, said nut being exteriorly formed with arcuate cut-out portions communicating with the openings extending through said nut whereby the U-shaped end of the key and the free ends of said key are received in said cut-out portions.

4. In combination, a pin, a nut and a U-shaped locking key, said pin having flat faces formed on one end and a reduced portion formed adjacent said flattened end, said nut being adapted to freely fit on to said pin in one position and to be rotated relative to said pin, said nut having shoulders adapted to enter the reduced portion of said pin beneath the flattened end of said pin, said nut having a pair of spaced openings extending therethrough adapted to receive said locking key, whereby said locking key engages the flat faces of said pin to prevent relative rotation between said pin and nut, the free ends of said key being bent towards each other to prevent displacement.

JOHN O'FALLON CLARK.